(12) United States Patent
Janning et al.

(10) Patent No.: US 8,302,761 B2
(45) Date of Patent: Nov. 6, 2012

(54) CONVEYING AND ISOLATING DEVICE

(75) Inventors: Hermann Janning, Lingen (DE);
Jürgen Schlump, Wettrup (DE)

(73) Assignee: Areva NP GmbH, Erlangen (DE)

( * ) Notice: Subject to any disclaimer, the term of this patent is extended or adjusted under 35 U.S.C. 154(b) by 77 days.

(21) Appl. No.: 12/966,072

(22) Filed: Dec. 13, 2010

(65) Prior Publication Data

US 2011/0132723 A1 Jun. 9, 2011

Related U.S. Application Data

(63) Continuation of application No. PCT/EP2009/002987, filed on Apr. 23, 2009.

(30) Foreign Application Priority Data

Jun. 13, 2008 (EP) .................................... 08010802

(51) Int. Cl.
*B65G 47/30* (2006.01)
(52) U.S. Cl. .................. 198/474.1; 198/418.4
(58) Field of Classification Search ............... 198/418.4, 198/474.1, 479.1
See application file for complete search history.

(56) References Cited

U.S. PATENT DOCUMENTS

| | | | | |
|---|---|---|---|---|
| 4,759,433 A | * | 7/1988 | Kraft | 198/418.7 |
| 4,986,409 A | * | 1/1991 | Alexander et al. | 198/418.4 |
| 5,341,913 A | * | 8/1994 | Francioni | 198/418.4 |
| 5,465,824 A | * | 11/1995 | Van Maanen | 198/418.4 |
| 5,529,167 A | * | 6/1996 | Gabriele | 198/457.01 |
| 6,349,815 B1 | * | 2/2002 | Shaffer | 198/418.4 |
| 7,582,321 B2 | * | 9/2009 | Mihalos et al. | 426/275 |
| 7,870,944 B2 | * | 1/2011 | Johnsson | 198/457.01 |

FOREIGN PATENT DOCUMENTS

DE 4124278 A1 1/1993

OTHER PUBLICATIONS

International Search Report dated Aug. 5, 2009.

* cited by examiner

*Primary Examiner* — Douglas Hess
(74) *Attorney, Agent, or Firm* — Laurence A. Greenberg; Werner H. Stemer; Ralph E. Locher

(57) ABSTRACT

An isolating device for isolating objects, in particular fuel pellets, contains a conveying device having a conveying belt with a conveying side and a backing side and is guided over at least two deflection pulleys and on which a number of pushing elements protruding from the conveying side of the conveying belt are arranged. The isolating device is configured for a particularly reliable and interruption-free isolation at a high processing speed. Each pushing element is connected with a directing element arranged on the backing side. The directing element includes a sliding surface facing away from the conveying belt. The conveying device contains a guide rail having a guiding surface for the directing elements arranged in a partial section of the conveying belt lying between the deflection pulleys. The sliding surface and the guiding surface are of a complementary shape so that the sliding surface can slide on the guiding surface.

10 Claims, 3 Drawing Sheets

CONVEYING AND ISOLATING DEVICE

CROSS-REFERENCE TO RELATED APPLICATION

This is a continuation application, under 35 U.S.C. §120, of copending international application No. PCT/EP2009/002987, filed Apr. 23, 2009, which designated the United States; this application also claims the priority, under 35 U.S.C. §119, of European patent application No. EP 08010802.0-2308, filed Jun. 13, 2008; the prior applications are herewith incorporated by reference in their entirety.

BACKGROUND OF THE INVENTION

Field of the Invention

The invention relates to a conveying device having a conveying belt which has a conveying side and a backing side and is guided over at least two deflection pulleys and on which a number of pushing elements protruding from the conveying side of the conveying belt are arranged. The invention also relates to an isolating device for isolating objects fed in groups, the isolation device has such a conveying device.

The nuclear fuel necessary for operating a nuclear plant is usually provided in the form of so-called pellets or tablets of substantially cylindrical shape. Before such fuel pellets, consisting, for example, of enriched uranium oxide, are inserted into a fuel-rod cladding tube for being arranged in a reactor core, the individual pellets are usually thoroughly inspected. For this purpose, the fuel pellets are preferably fed to an inspection line of an automated inspection device. Fuel pellets whose dimensions, quality or other physical properties do not fulfil the specified requirements will be treated as rejects and will be sorted out.

Usually, the fuel pellets are fed to the inspection device in groups in the form of coherent columns or stacks and have to be isolated before entering the inspection line. This is effected, for example, by a circulating conveying belt ("endless belt") guided over two deflection pulleys, which includes on its (outer) conveying side a plurality of pushing elements, in particular pushing pins, preferably arranged at uniform intervals. The pellet columns are fed to the conveying belt in the area of one of the deflection pulleys and, with suitable coordination of feeding speed, circulating speed of the conveying belt, and intervals between the pins, they are put between the pushing pins and thus isolated.

Such an isolating device is known, for example, from published, non-prosecuted German patent application DE 41 24 278 A1. On it, the pushing pins are screwed to the conveying belt by a flat nut. During operation, disturbances of the isolating process occur from time to time, making it necessary to slow down or even stop the conveying belt and possibly requiring a manual correcting intervention. Therefore the overall processing speed is reduced and the operators are possibly exposed to increased radiation due to the manual interventions.

SUMMARY OF THE INVENTION

It is accordingly an object of the invention to provide a conveying and an isolating device which overcomes the above-mentioned disadvantages of the prior art devices of this general type, which enables a particularly reliable and interruption-free isolation of objects fed in groups, at, at the same time, a high processing speed.

With the foregoing and other objects in view there is provided, in accordance with the invention a conveying device. The conveying device contains at least two deflection pulleys, a conveying belt having a conveying side and a backing side and guided over the at least two deflection pulleys, a number of pushing elements protruding from the conveying side of the conveying belt and directing elements. Each of the pushing elements is connected with one of the directing elements disposed on the backing side. The directing elements each include a sliding surface facing away from the conveying belt. A guide rail is provided and has a guiding surface for the directing elements being disposed in at least one partial section of the conveying belt lying between the deflection pulleys. The sliding surface and the guiding surface are of complementary shape so that the sliding surface of each of the directing elements can slide on the guiding surface of the guide rail.

This problem is solved according to the invention by connecting each pushing element with a directing element arranged on the backing side. The directing element has a sliding surface facing away from the conveying belt. The conveying device has a guide rail with a guiding surface for the directing elements being arranged in at least one partial section of the conveying belt lying between the deflection pulleys, and the sliding surface and the guiding surface are of complementary shape so that the sliding surface of each directing element can slide on the guiding surface of the guide rail.

Preferably, each directing element includes a rolling surface facing the conveying belt, and at least one of the deflection pulleys includes a ring groove formed in its periphery for receiving and guiding the directing elements moving past it during operation of the conveying belt. Advantageously, the rolling surface is curved and the sliding surface is substantially flat.

The invention is based on the knowledge that the problems occurring during operation of the plants known so far are, in any case in part, due to the fact that the pushing elements or pins are not uniformly aligned to the conveying belt and are in particular—relative to the direction of movement of the conveying belt—inclined forwards or backwards. Therefore the distances between the free ends of the pushing pins might slightly vary, in spite of a regular arrangement of the base pieces of the pushing pins fastened on the conveying belt. At a relatively high feeding speed of, for example, ten fuel pellets per second, however, even such slight irregularities might have an effect, leading to an interruption of the quasi-continuous isolating process.

To avoid such difficulties, an alignment of the pushing elements as regular as possible, preferably normal to the running surface of the conveying belt, is now provided. For this purpose, each pushing element is connected, preferably through a connecting piece passing through a recess in the conveying belt, with a directing element designed in such a way that during operation of the conveying belt, it slides in, and along, a guide rail allocated to it, arranged on the (inner) backing side, thus being guided. The connecting piece and/or the directing element can be an integral part of the pushing element or else be separate parts rigidly connected with each other by corresponding connecting elements. As the directing element has on its side facing away from the conveying belt a flat sliding surface supported by an allocated sliding surface of the guide rail, sliding over the latter when moving, an automatic alignment of the directing elements and thus also of the pushing elements is guaranteed—in any case in the area of the guide rail.

Furthermore, a centering of the pushing elements or pins in their nominal position, preferably vertically protruding from the conveying belt, especially also in the turning points of the conveying belt, is provided. For this purpose, each deflection pulley includes a circulating recess or ring groove formed in its periphery, i.e. in the running surface for the conveying belt. This ring groove serves, on the one hand, for an unhindered movement of the passing directing elements past the deflection pulley. On the other hand, it effects, in the manner of a circularly curved guide rail, the guidance and alignment of the directing elements, especially also in the area of the deflection pulleys, so that the pushing element connected with the respective directing element is always in preferably radially outward orientation during its passage past the deflection pulley.

In a particularly expedient embodiment, each directing element has two front faces in the shape of segments of a circle, oriented parallelly to the plane of rotation of the conveying belt. The chords of the two segments of a circle are connected with each other through a flat sliding surface facing away from the conveying belt. The arcs of a circle of the segments are connected with each other through a curved rolling surface facing the conveying belt and touching it at least in its apex area. Expediently, the radius of the circle characterizing each segment is substantially identical with the outer radius of at least one of the deflection pulleys, preferably of all deflection pulleys. Advantageously, the segment height characterizing each segment is substantially identical with the depth of the ring groove in at least one of the deflection pulleys, preferably of all deflection pulleys. Advantageously, the outer shape and dimension of all directing elements are substantially identical. Accordingly, advantageously, the outer radius and the depth of the ring groove of the deflection pulleys for the conveying belt are also substantially identical. In the simplest variant, two deflection pulleys can be provided, each of them effecting a 180° deflection of the conveying belt otherwise extending in a straight line. Alternatively, however, the conveying belt could also be guided over more than two deflection pulleys. In addition, mere supporting pulleys without deflection of direction can be provided.

The described geometry of directing elements and deflection pulleys offers the advantage that each directing element, during its movement along the deflection pulley, projects over the latter's outer radius in no place and at no time and that, at the same time, the center of its sliding surface always touches the allocated sunk-in guiding surface of the deflection pulley. In this way, the preferably rod-shaped pushing elements are at all times aligned normal to the conveying belt. Furthermore, the conveying belt encompasses each deflection pulley in that case in an exact arc of a circle without any "bulges". In this way, so-called polygon effects are avoided, which—in particular when the deflection pulley acts as a drive roller for the conveying belt—might cause undesired longitudinal vibrations due to a discontinuous power transmission.

In addition, the width of the directing element and the width of the ring grooves in the deflection pulleys are advantageously coordinated in such a way that a lateral guidance is given, too.

In an advantageous embodiment, teeth are arranged on each deflection pulley, engaging a complementary row of teeth of the conveying belt, so that a slip-free, positive transmission of motion from a preferably driven deflection pulley to the conveying belt is realized, preferably in a form-locking manner.

Advantageously, the conveying device is a component of an isolating device for isolating objects fed in groups, in particular fuel pellets for a nuclear plant, a feeding device for the objects to be isolated being provided in the area of one of the deflection pulleys, in particular in the area of a 180° deflection pulley.

The discharge or release of the isolated objects is advantageously provided near a deflection point for the conveying belt, through which a directional deviation is effected in an angular range between 5° and 40°, in particular between 5° and 10°.

For example, the discharge point can be arranged—viewed in conveying direction—closely behind a point where the conveying belt is deflected or "bent" from a horizontal position into an orientation inclined obliquely downwards. With a suitable horizontal guidance of the objects to be isolated, the pushing elements are then lowered on the deflection pulley and automatically "disappear" under the isolated objects, thus releasing them. Due to the fact that a deflection only takes place in the above-mentioned angular range and no full 180° deflection is provided, the pushing elements have at the discharge point a relatively low rotational speed, which facilitates their release.

The advantages achieved with the invention consist in particular in that a suitable guidance of the pushing elements on a circulating conveying belt by associated rail-guided "sliding blocks" provides that the pushing elements are aligned in any place and at any time, in particular also at the deflection points, in an exactly defined manner, preferably normal to the conveying belt. This enables a particularly reliable feeding and withdrawing of objects onto/from the conveying belt, even at a relatively high conveying speed.

Other features which are considered as characteristic for the invention are set forth in the appended claims.

Although the invention is illustrated and described herein as embodied in a conveying and isolating device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
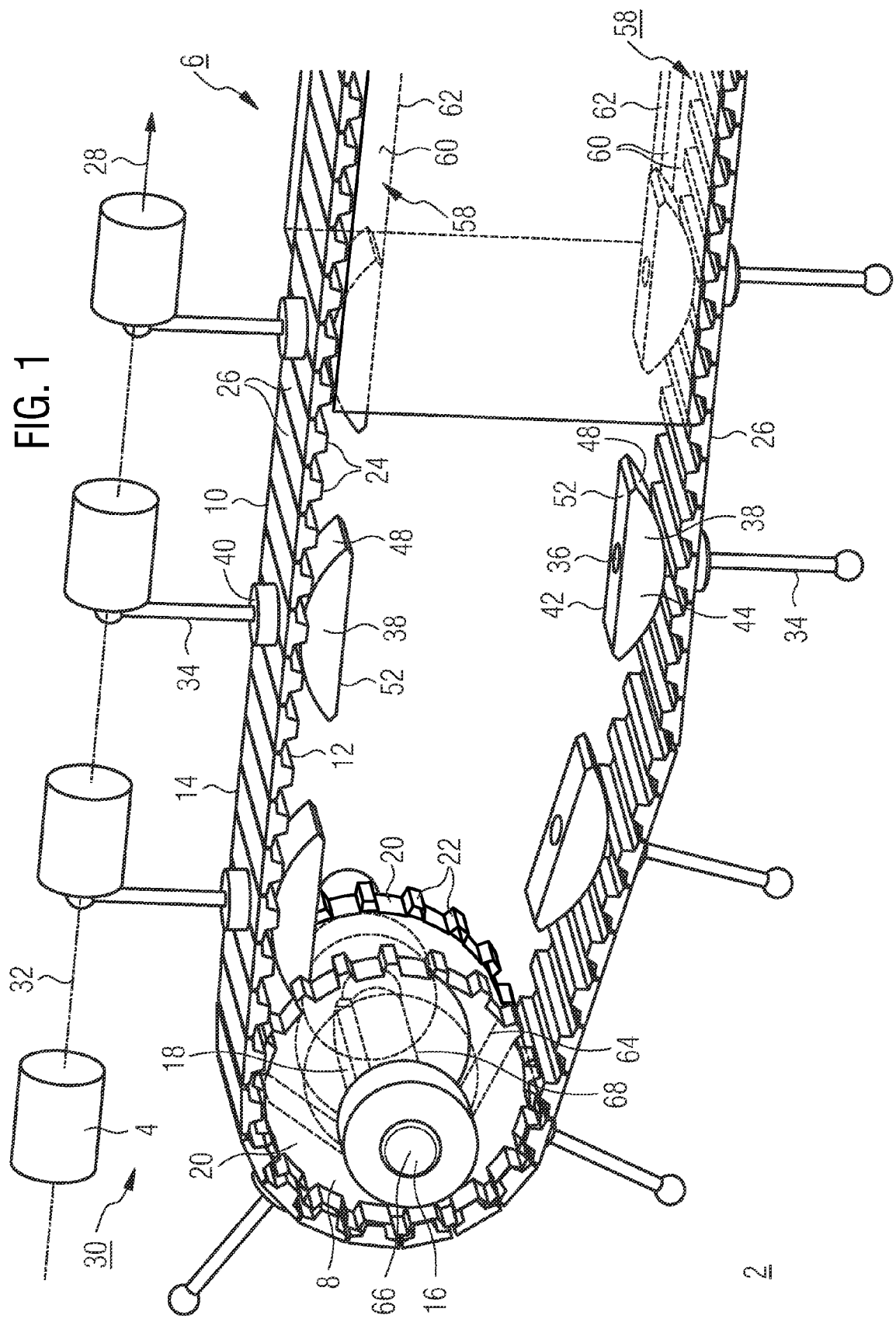
FIG. 1 is a diagrammatic, perspective, partially sectional, view of an isolating device for fuel pellets according to the invention.

Identical parts are marked with identical reference numbers in all figures.

Referring now to the figures of the drawing in detail and first, particularly, to FIG. 1 thereof, there is shown an isolating device 2 in a perspective view that serves for isolating and subsequently conveying fuel pellets 4 made of fissile material, for instance uranium oxide, fed in groups in the manner of columns or stacks.

The isolating device 2 contains a conveying device 6 with a conveying belt 10 guided over two deflection pulleys 8. Each of the two deflection pulleys 8, only one of which is shown in FIG. 1, effects a 180° deflection of direction of the "endless" circulating conveying belt 10. The conveying belt 10 has an inner backing side 12 facing the deflection pulleys 8 and an outer conveying side 14. The deflection pulley 8 shown in FIG. 1 is configured at the same time as a drive roller for the conveying belt 10 and is connected by a shaft 16 with a non-illustrated drive unit, which contains an electric motor and possibly a transmission. For an effective transformation, as slip-free as possible, of the rotational movement of the deflection pulley 8 into a forward movement of the conveying belt 10, the deflection pulley 8 includes two axially spaced toothed wheels 20, connected through a central shaft piece 18, of identical orientation, having teeth 22 arranged on their peripheries, the teeth 22 engaging a corresponding row of teeth 24 on the backing side 12 of the conveying belt 10. In this way, a positive power and movement transmission is realized. In the exemplary embodiment, the conveying belt 10—similar to a link-articulated chain—consists of a plurality of links 26 flexibly connected with each other, or of a reinforced plastic toothed belt, respectively, which are profiled on the backing side 12 to form the row of teeth 24. The second deflection pulley, not shown here, is of similar construction as the deflection pulley 8 visible in FIG. 1; however, it is designed as a simple roller without a drive of its own.

The conveying belt 10 is configured for conveying fuel pellets 4 in the horizontally oriented conveying direction 28 marked by an arrow. The cylindrical fuel pellets 4 stacked in columns are fed to the conveying belt 10 in FIG. 1 during operation of the plant, coming from the left side, in a feeding region or feeding device 30 arranged above the deflection pulley 8. By means of a guidance (not shown), the freedom of motion of the fuel pellets 4 is restricted in such a way that they can only move above the conveying belt 10 and in parallel to the latter's longitudinal orientation in the conveying direction 28 (i.e. in this case, from left to right), the trajectory 32 being represented by a dash-dotted line. The isolation as well as the subsequent conveyance of the fuel pellets 4 is effected by pushing elements 34, in particular pushing pins, fastened at regular intervals on the conveying belt 10 and protruding outwards therefrom. The isolation is effected in the area of the deflection pulley 8 by the pushing elements 34 which, due to their circulating movement around the deflection pulley 8, push between the individual fuel pellets 4, with a suitable coordination of feeding speed and circulating speed of the conveying belt. Then, the fuel pellets 4 separated in this manner are pushed on by the pushing elements 34 in the conveying direction 28 and thus conveyed to the right, e.g. to an inspection section, not shown here, with associated image processing systems.

The conveying device 6 is configured for a particularly reliable isolation of the fuel pellets 4, even at high circulating speeds of the conveying belt 10. For this purpose, the pushing elements 34 are fastened on the conveying belt 10 in such a manner that they automatically align normal to the conveying belt 10 and cannot slant in particular in, or against, the conveying direction 28. For this purpose, each pushing element 34 passes through a corresponding recess in the conveying belt 10 and rigidly connected, e.g. screwed, by a connecting piece 36, to a directing element 38 arranged on the backing side 12. On the opposite side, i.e. the conveying side 14, an additional support of the pushing element 34 is provided through an enlarged base 40 resting on the conveying belt 10. During circulation of the conveying belt 10, each directing element 38 slides in a guidance adapted thereto in such a manner that this so-called slide-block or slide-shoe guidance effects an automatic alignment and centering of the directing element 38 and thus also of the pushing element 34 connected with it.

Figure 2:
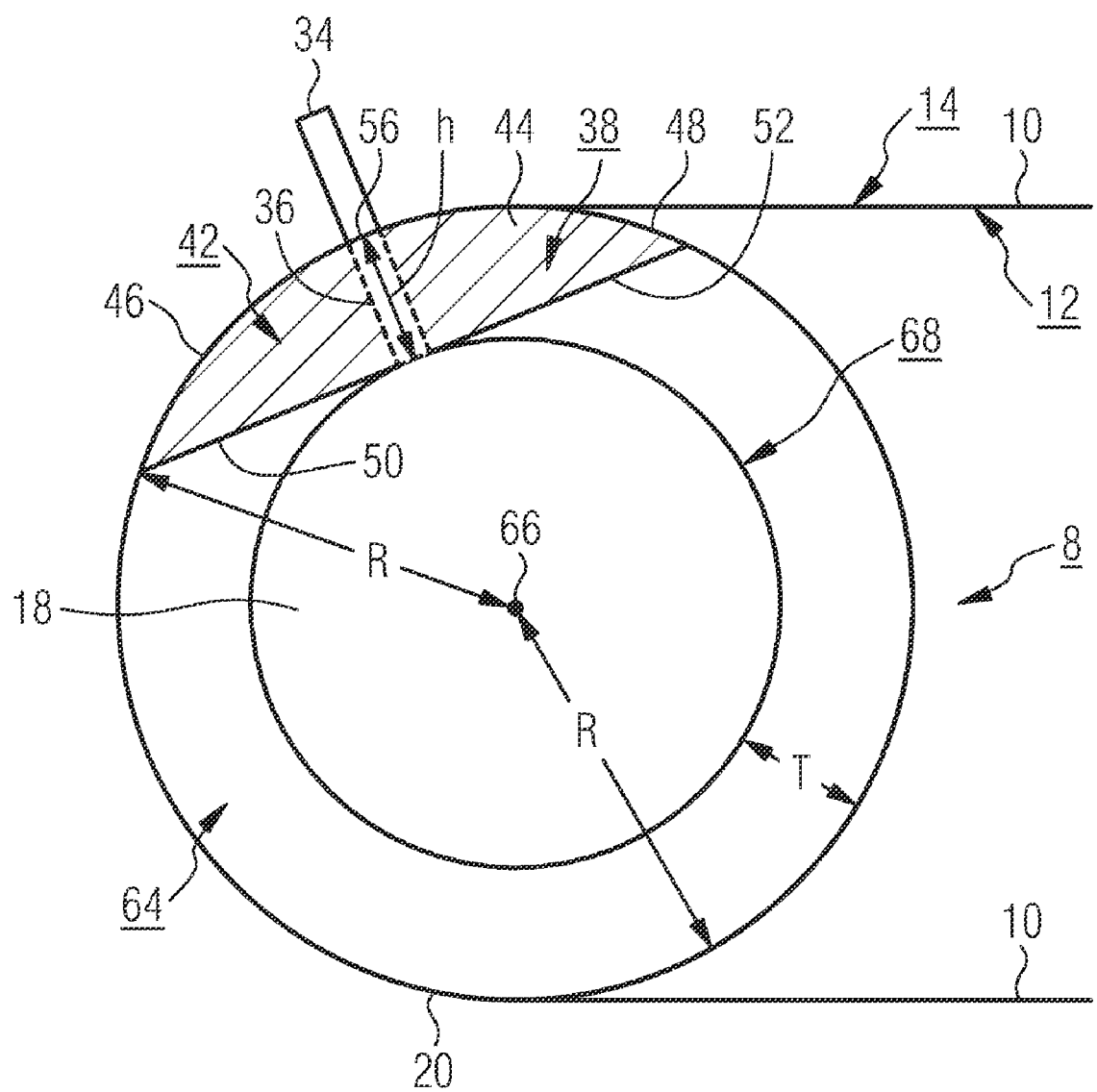
FIG. 2 is a diagrammatic, sectional view through one of the deflection pulleys of a conveying belt in the isolating device according to FIG. 1.

In detail, as is clearly visible, e.g. also by the drawing of FIG. 2, each directing element 38 containing two front faces 42 in the shape of segments of a circle 44, which are parallel to each other and to the conveying direction 28. The arcs of a circle 46 of the two segments of a circle 44 are connected with each other by a curved rolling surface 48 facing the conveying belt 10. The chords 50 of the two segments of a circle 44 are connected with each other by a flat sliding surface 52 facing inwards and facing away from the conveying belt 10. The connecting piece 36 of the pushing element 34 passes through a recess centrically formed into the directing element 38 and fastened (e.g. screwed) therein, so that the apex 56 of the directing element 38 touches the conveying belt 10 when the latter is in straight-line, uncurved orientation. When the conveying belt 10 is bent through the effect of the deflection pulley 8, it can completely or partially adapt itself to the rolling surface 48, the directing element 38 rolling on the conveying belt 10, so to speak; therefore, it is called here "rolling surface". Each directing element 38 as a whole has, therefore, the shape of a cylinder segment (based on a straight full cylinder) generated by parallel displacement of a segment of a circle 44, the rolling surface 48 representing a corresponding part of an envelope of cylinder.

In a straight-line section of the conveying belt 10, lying between two deflection pulleys 8, each pushing element 34 is aligned by the directing element 38 connected therewith sliding in a straight-line guide rail 58, which is represented only schematically and in a sectional view in FIG. 1. The guide rail 58 is arranged on the backing side 12 of the conveying belt 10 and has two lateral guiding surfaces 60 as well as an inner guiding surface 62. The dimensions are chosen such that the front faces 42 of each directing element 38 can slide along the lateral guiding surfaces 60 of the guide rail 58, while being guided. Accordingly, the flat sliding surface 52 of the directing element 38 slides on the inner guiding surface 62 of the guide rail 58. As the sliding surface 52 of the directing element 38 rests flatly on the inner guiding surface 62 of the guide rail 58 and cannot tilt, the alignment of each pushing element 34 normal to the conveying belt 10 is guaranteed—in any case in the area of the sections provided with the guide rail 58.

Furthermore, a corresponding guidance of each directing element 38 and thus an alignment of the pushing element 34 normal to the conveying belt is provided also in the area of the deflection pulley 8. For this purpose, the deflection pulley 8 includes a peripheral ring groove 64 of constant depth between the two toothed wheels 20 which are in contact with the conveying belt 10. The ring groove 64 serves for receiving and guiding each directing element 38 while the latter passes the deflection pulley. For illustration and better visibility, the corresponding areas are represented in FIG. 1 partly in sectional view or transparent.

Furthermore, the geometrical relations are clearly recognizable in the schematic sectional view of FIG. 2, showing no details: the radius characterizing each segment of a circle 44 is identical with the outer radius R of the deflection pulley 8, i.e. with the (identical) radii of the two toothed wheels 20. The segment height h characterizing each segment of a circle 44, i.e. the distance between the apex 56 and the chord 50, is identical with the depth T of the ring groove 64. Thus, the conveying belt 10 follows the outer profile of the deflection pulley 8 defined through the radius of the toothed wheels 20 (=outer radius R of the deflection pulley 8). While orbiting around the central axis 66, the directing element 38 is conveyed sunk into the ring groove 64. More precisely, this is effected in such a way that it projects over the radius R of the toothed wheels 20 in no place and that, at the same time, the sliding surface 52 centrically touches the supporting surface 68, i.e. the outer periphery of the shaft piece 18 lying between the two toothed wheels 20. As the preferably tight conveying belt 10 rests on the entire extension of the rolling surface 48, while passing the curvature, the directing element 38 is secured against tilting around its apex 56 even on this partial section of its movement. Therefore, the pushing element 34 (viewed from the central axis 66) always protrudes exactly radially outwards.

Summarizing, it can be stated that the pushing elements 34 are accurately guided and aligned both during straight-line conveyance and in the deflection points of the conveying belt 10, so that the fuel pellets 4 are released and isolated in the deflection points in a particularly reliable manner. An interrogation of element positions in this area, e.g. for selecting a subsequent automatic inspection device, will supply particularly reliable values.

Figure 3:
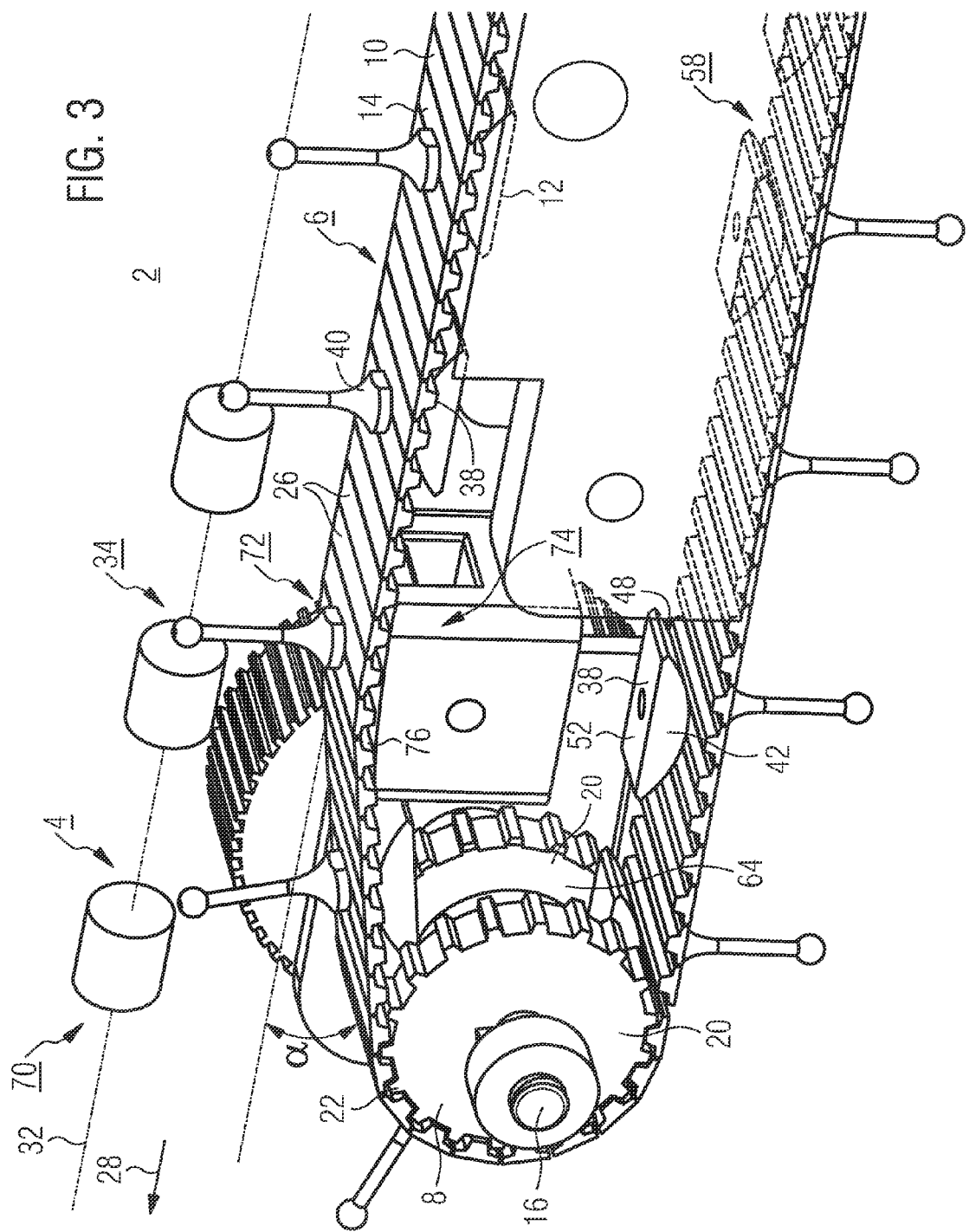
FIG. 3 is diagrammatic, perspective view of the isolating device for fuel pellets.

FIG. 3 also shows the discharge end, opposite to the feeding side, of the isolating device 2 (here, the fuel pellets 4 are conveyed from right to left). For an easier discharge or release of the isolated fuel pellets 4, it is provided that the conveying belt 10 and thus also the pushing elements 34 are lowered before a discharge point 70. For this purpose, the conveying belt 10 is brought, at a deflection point 72, from its previous horizontal orientation into an orientation inclined obliquely downwards. The deflection of direction a is in the example 15°. In this way, the pushing elements 34 are automatically lowered behind the deflection point 72 under the fuel pellets 4 guided in horizontal direction, thus releasing them. Contrary to the region of the following deflection pulley 8, where a deflection of direction of the conveying belt 10 by 165° is effected, the pushing elements 34 have on the deflection point 72 a relatively low rotational speed, which facilitates the release of the fuel pellets 4. The deflection on the deflection point 72 is effected in the exemplary embodiment by a formed part 74 correspondingly profiled on its side facing the conveying belt 10, which acts at the same time in the above-mentioned manner as a guide rail for the directing element 38 of the pushing elements 34, the conveying belt 10 sliding over a supporting surface 76 of the formed part 74. Alternatively, a deflection pulley, similar to the end-side deflection pulley 8, could be provided in this place for a deflection of direction.

While specific embodiments have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope described herein, which is to be given the full breadth of the appended claims and any and all equivalents thereof.

The invention claimed is:

1. A conveying device, comprising:
    at least two deflection pulleys;
    a conveying belt having a conveying side and a backing side and guided over said at least two deflection pulleys;
    a number of pushing elements protruding from said conveying side of said conveying belt;
    directing elements, each of said pushing elements connected with one of said directing elements disposed on said backing side, said directing elements each including a sliding surface facing away from said conveying belt, each of said directing elements having a rolling surface facing said conveying belt; and
    a guide rail having a guiding surface for said directing elements being disposed in at least one partial section of said conveying belt lying between said deflection pulleys, said sliding surface and said guiding surface being of complementary shape so that said sliding surface of each of said directing elements can slide on said guiding surface of said guide rail;
    at least one of said deflection pulleys having a periphery with a ring groove formed therein in said periphery for receiving and guiding said directing elements moving past said ring groove during operation of said conveying belt.

2. The conveying device according to claim 1, wherein said rolling surface is curved, and said sliding surface and said guiding surface are substantially flat.

3. The conveying device according to claim 2, wherein said rolling surface and said sliding surface of each of said directing elements connecting two front faces in a shape of segments of a circle with each other.

4. The conveying device according to claim 3, wherein a radius of said circle characterizing each segment of said circle is substantially a same as an outer radius of at least one of said deflection pulleys.

5. The conveying device according to claim 3, wherein a segment height characterizing each segment of said circle is substantially a same as a depth of said ring groove in at least one of said deflection pulleys.

6. The conveying device according to claim 1, wherein:
    said pushing elements have connecting pieces;
    said conveying belt has a plurality of recesses formed therein; and
    each of said pushing elements is connected with one of said directing elements by means of one of said connecting pieces passing through one of said recesses in said conveying belt.

7. The conveying device according to claim 1, wherein:
    said conveying belt has teeth; and
    each of said deflection pulleys has teeth engaging a complementary row of said teeth of said conveying belt.

8. An isolating device for isolating objects, including fuel pellets for a nuclear plant fed in groups, the isolating device comprising:
    a conveying device containing:
        at least two deflection pulleys;
        a conveying belt having a conveying side and a backing side and guided over at least said two deflection pulleys;
        a number of pushing elements protruding from said conveying side of said conveying belt;
        directing elements, each of said pushing elements connected with one of said directing elements disposed on said backing side, said directing elements each including a sliding surface facing away from said conveying belt, each of said directing elements having a rolling surface facing said conveying belt;
        a guide rail having a guiding surface for said directing elements being disposed in at least one partial section of said conveying belt lying between said deflection pulleys, said sliding surface and said guiding surface being of complementary shape so that said sliding surface of each of said directing elements can slide on said guiding surface of said guide rail; and
        at least one of said deflection pulleys having a periphery with a ring groove formed therein in said periphery for receiving and guiding said directing elements moving past said ring groove during operation of said conveying belt; and
    a feeding device for the objects to be isolated being provided in an area of one of said deflection pulleys.

9. The isolating device according to claim 8, wherein a discharge of the isolated objects is provided near a deflection point of said conveying belt, through which a directional deviation is effected in an angular range between 5° and 40°.

10. The isolating device according to claim 8, wherein a discharge of the isolated objects is provided near a deflection point of said conveying belt, through which a directional deviation is effected in an angular range between 5° and 10°.

* * * * *